3,114,760
FLUORINE-CONTAINING ALKOXYCHLORO-SILANES

Earl T. McBee, West Lafayette, Ind., and Ogden R. Pierce, Midland, Mich., assignors, by mesne assignments, to Research Corporation, New York, N.Y., a corporation of New York
No Drawing. Filed Feb. 7, 1955, Ser. No. 486,733
3 Claims. (Cl. 260—448.8)

This invention relates to fluorine-containing alkoxychlorosilanes and is more particularly concerned with alkoxychlorosilanes having from one to three chlorine atoms wherein the fluorine is present in a lower-perfluoroalkyl group.

The compounds of the present invention may be illustrated by the following formula:

$$(RR_1O)_nSiCl_{4-n}$$

wherein $n$ represents an integer from 1 to 3, R represents a lower-perfluoroalkyl group and $R_1$ represents a lower-alkylene group. Among the lower-perfluoroalkyl groups represented by R are those having from 1 to about 8 carbon atoms. Among the lower-alkylene groups represented by $R_1$ are those having from 1 to about 10 carbon atoms.

The compounds of the present invention may be described as perfluoro-lower alkyl substituted lower alkoxychlorosilanes. One, two or three of the chlorine atoms attached to the silicon atom may be replaced by lower-perfluoroalkyl-alkoxy groups. These compounds are usually high-boiling liquids, boiling at above about 40 degrees centigrade at pressures of about 10 millimeters. They are useful as starting materials, for example, in making fluorine-containing orthosilicates such as are disclosed in applicants' co-pending application Serial 486,-735, filed February 7, 1955, now abandoned, and also in Smith-Johannsen U.S. Patent 2,643,964, issued June 30, 1953.

The perfluoro-lower-alkyl substituted-lower-alkoxy chlorosilanes of the present invention can be prepared by the reaction of a lower-perfluoroalkyl substituted-alcohol with silicon tetrachloride. The reaction requires the presence of a proton acceptor or polar solvent which serves to remove hydrogen chloride from the reaction mixture as it is formed, such as a tertiary amine. Examples of tertiary amines which may be used include pyridine, dimethyl aniline and trimethyl aniline.

While the alcohol may be reacted with silicon tetrachloride in the presence of the polar solvent in the approximate molar ratio of 1:1:2, better yields may be obtained by using a slight excess of the silicon tetrachloride and an excess of the polar solvent. It is preferred to conduct the reaction in a solvent such as anhydrous ether or tetrahydrofuran because a low boiling point solvent facilitates the separation of the solvent from the reaction products.

The reaction of the alcohol and silicon tetrachloride in the presence of a tertiary amine generally results in the formation of three perfluoro-lower alkyl substituted-lower alkoxy chlorosilanes, the mono-, di- and trichlorosilane. The dichlorosilane is usually the major reaction product, with a smaller amount of the trichlorosilane and a very small amount of the monochlorosilane also being formed.

The preferred procedure for making the compounds of the present invention is to distill the silicon tetrachloride into a flask containing anhydrous ether. Pyridine is then added. The silicon tetrachloride forms a complex with two moles of pyridine and the compound precipitates as a white solid from the ether solution. The fluorine-containing alcohol is added slowly to the flask in a dropwise manner. When the addition is complete, the reaction mixture is refluxed with stirring for at least two days. The reaction product is then filtered under a nitrogen atmosphere and fractionally distilled at reduced pressures.

The following examples indicate methods by which members of the new group of compounds may be prepared, but are in no way to be construed as limiting the invention thereto.

EXAMPLE 1

*The Reaction of Silicon Tetrachloride With 3,3,4,4,5,5,5-Heptafluoro-2-Methyl-2-Pentanol*

Into a three-liter, three-necked flask fitted with a ball joint sealed Hershberg stirrer, reflux condenser and dropping funnel, containing two pounds of anhydrous ether, there was distilled 167.8 grams (0.98 mole) of silicon tetrachloride. To this was added 158 grams (2.0 moles) of pyridine which resulted in the precipitation of a white complex of silicon tetrachloride and pyridine. To this slurry 178.1 grams (0.78 mole) of the tertiary alcohol, 3,3,4,4,5,5,5-heptafluoro-2-methyl-2-pentanol, was added dropwise in 100 minutes without any noticeable change. The flask was then heated to reflux for 60 hours with stirring, and cooled. The mixture was forced from the reaction flask under nitrogen pressure through a large sintered glass funnel into a one-liter, two-necked flask fitted with a Vigreux column with a fractionating head attached. There was obtained 216.2 grams of a solution which was separated by rectification into the following fractions:

| Temperature in ° C. | Pressure in Millimeters of Mercury | Weight in Grams |
|---|---|---|
| 44–113 | 751 | 12.3 |
| 40.5–47 | 10 | 2.6 |
| 46.5–47 | 10 | 56.9 |
| 90–98 | 10 | 3.5 |
| 98–98.5 | 10 | 119.0 |
| 132.5–133 | 10 | 1.9 |
| Residue | | 5.6 |

There was thus obtained 56.9 grams (approximately 20 percent of the theoretical yield) of 3,3,4,4,5,5,5-(heptafluoro-2-methyl-2-pentoxy)trichlorosilane, boiling at 46.5–47° C./10 mm.

*Analysis.*—Calculated for $C_3F_7C(CH_3)_2OSiCl_3$: C, 19.92; H, 1.67. Found: C, 19.68; H, 1.78.

There was also obtained 119 grams (approximately 57.5 percent of the theoretical yield) of bis-(3,3,4,4,5,5,5-heptafluoro-2-methyl-2-pentoxy)dichlorosilane, boiling at 98–98.5° C./10 mm.

*Analysis.*—Calculated for $[C_3F_7C(CH_3)_2O]_2SiCl_2$: C, 26.04; H, 2.18. Found: C, 26.17; H, 2.14.

There was also obtained 1.9 grams (approximately one percent of the theoretical yield) of tris-(3,3,4,4,5,5,5-heptafluoro-2-methyl-2-pentoxy)chlorosilane, boiling at 132.5–133° C./10 mm.

*Analysis.*—Calculated for $[C_3F_7C(CH_3)_2O]_3SiCl$: C, 29.01; H, 2.43. Found: C, 28.99; H, 2.58.

Among the other compounds within the scope of the present invention which may be made by following the procedure of Example 1 are:

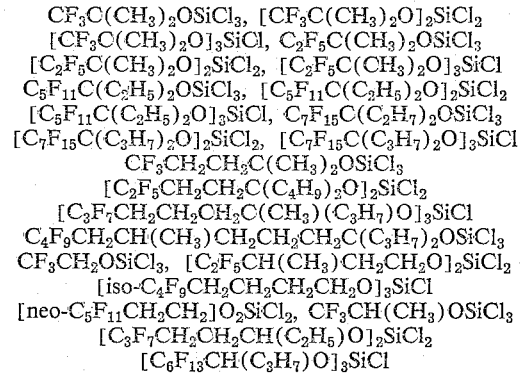

Thus, for example, by reacting $C_5F_{11}C(C_2H_5)_2OH$ with $SiCl_4$ in the presence of dimethyl aniline, and following the procedure of Example 1, the three alkoxy-chlorosilanes $C_5F_{11}C(C_2H_5)_2OSiCl_3$, $[C_5F_{11}C(C_2H_5)_2O]_2SiCl_2$, and $[C_5F_{11}C(C_2H_5)_2O]_3SiCl$ may be prepared.

By reacting iso-$C_4F_9CH_2CH_2CH_2CH_2OH$ with $SiCl_4$ in the presence of trimethyl aniline, and following the procedure of Example 1,

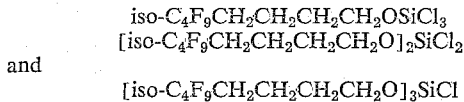

and

[iso-$C_4F_9CH_2CH_2CH_2CH_2O]_3SiCl$ may be prepared.

And by reacting $CF_3CH(CH_3)OH$ with $SiCl_4$ in the presence of pyridine, and following the procedure of Example 1, $CF_3CH(CH_3)OSiCl_3$, $[CF_3CH(CH_3)O]_2SiCl_2$ and $[CF_3CH(CH_3)O]_3SiCl$ may be prepared.

The following is an example of the reactions which the perfluoro-lower alkyl substituted-lower-alkoxy chlorosilanes of the present invention undergo:

REACTION 1

*Tris-(2,2,3,3,4,4,4-Heptafluorobutoxy)-(3,3,4,4,5,5,5-Heptafluoro-2-Methyl-2-Pentoxy)Silane*

Into a two-liter, two-necked flask with a thermometer well and a Y tube fitted with an addition funnel and a water condenser followed by a Dry Ice condenser connected to an absorption flask, there was placed 209.3 grams (1.049 moles) of 2,2,3,3,4,4,4-heptafluorobutanol. To the refluxing alcohol 103.8 grams (0.196 mole) of bis-(3,3,4,4,5,5,5-heptafluoro-2-methyl-2-pentoxy)-dichlorosilane was added dropwise over a period of 32 minutes. After refluxing for six hours only a trace of hydrogen chloride had been evolved. The reaction mixture was transferred to a three-liter, three-necked flask fitted with a reflux condenser and a plug and ball joint sealed Hershberg stirrer. The reaction mixture was diluted with one pound of ether. Then 10 grams (0.435 gram atom) of sodium in the form of small pieces, was added to the reaction mixture over a period of 20 minutes. Sodium chloride was precipitated slowly and the reaction mixture was stirred for 20 hours. Then the reaction mixture was forced through a sintered glass filtering funnel by nitrogen pressure. The filtration was so slow that diminished pressure had to be applied to the receiver. The filtrate and washings weighed 223.9 grams. The filtrate was rectified on a Todd column into 10 fractions. The results indicated some extremely close boiling compounds, so several fractions were combined for rectification on a miniature "Hypercal Podbielniak" column. There was thus obtained 24.8 grams (approximately 14.8 percent of the theoretical yield) of product boiling at 119.2–120° C./9.3 mm. having a refractive index ($n_D^{20.3}$) of 1.3100.

*Analysis.*—Calculated for $$C_3F_7C(CH_3)_2OSi(OCH_2C_3F_7)_3$$

C, 25.52; H, 1.53. Found: C, 25.37; H, 1.44.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. (3,3,4,4,5,5,5 - heptafluoro - 2 - methyl - 2 - pentoxy)trichlorosilane.
2. bis - (3,3,4,4,5,5,5 - heptafluoro - 2 - methyl - 2 - pentoxy)dichlorosilane.
3. tris - (3,3,4,4,5,5,5 - heptafluoro - 2 - methyl - 2 - pentoxy)chlorosilane.

References Cited in the file of this patent

UNITED STATES PATENTS

| | | |
|---|---|---|
| 2,666,797 | Husted et al. | Jan. 19, 1954 |
| 2,778,758 | Henning | Jan. 22, 1957 |
| 2,993,925 | Husted | July 25, 1961 |

OTHER REFERENCES

Lovelace et al.: "Aliphatic Fluorine Compounds," Reinhold Publishing Corp., New York, 1958, pp. 137–8.

UNITED STATES PATENT OFFICE
CERTIFICATE OF CORRECTION

Patent No. 3,114,760　　　　　　　　　　　　December 17, 1963

Earl T. McBee et al.

It is hereby certified that error appears in the above numbered patent requiring correction and that the said Letters Patent should read as corrected below.

Column 3, line 13, for "$C_7F_{15}C(C_2H_7)_2OSiCl_3$" read -- $C_7F_{15}C(C_3H_7)_2OSiCl_3$ --; line 22, for "$[neo-C_5F_{11}CH_2CH_2]O_2SiCl_2$" read -- $[neo-C_5F_{11}CH_2CH_2O]_2SiCl_2$ --.

Signed and sealed this 26th day of May 1964.

(SEAL)
Attest:

ERNEST W. SWIDER

Attesting Officer

EDWARD J. BRENNER

Commissioner of Patents